United States Patent [19]

Wiles

[11] Patent Number: 5,570,183

[45] Date of Patent: Oct. 29, 1996

[54] APPARATUS FOR MEASURING OPTICAL CHARACTERISTICS OF A SURFACE IN TWO DIMENSIONS USING A MOVING LIGHT SOURCE

[75] Inventor: Gregory R. Wiles, Royal Oak, Mich.

[73] Assignee: ATI Systems, Inc., Madison Heights, Mich.

[21] Appl. No.: 426,963

[22] Filed: Apr. 24, 1995

[51] Int. Cl.[6] .................... G01B 11/30; G01B 11/24; G02B 26/08
[52] U.S. Cl. .................... 356/371; 356/376; 359/216; 359/217; 250/235
[58] Field of Search .................... 356/371, 376; 359/201, 202, 216, 217, 218, 219; 348/203; 250/235

[56] References Cited

U.S. PATENT DOCUMENTS

| | | | |
|---|---|---|---|
| 4,629,319 | 12/1986 | Clarke et al. | 356/237 |
| 4,900,146 | 2/1990 | Penney et al. | 356/376 |
| 4,989,984 | 2/1991 | Salinger | 356/376 |
| 5,078,463 | 1/1992 | Kawawada | 359/201 |

*Primary Examiner*—F. L. Evans
*Assistant Examiner*—Amanda Merlino
*Attorney, Agent, or Firm*—Gifford, Krass, Groh, Sprinkle, Patmore, Anderson & Citkowski, P.C.

[57] ABSTRACT

A system for measuring optical characteristics of a surface such as orange peel includes a light source and detector retained upon a support block and translatable as a single unit. The light source emits a beam which is scanned across the workpiece surface by a moving mirror so as to produce a scan line. Translation of the light source causes the scan line to move across the workpiece. The associated detector reads the light reflected from the workpiece and produces a signal which may be processed to determine orange peel or other optical characteristics of the surface.

15 Claims, 2 Drawing Sheets

APPARATUS FOR MEASURING OPTICAL CHARACTERISTICS OF A SURFACE IN TWO DIMENSIONS USING A MOVING LIGHT SOURCE

FIELD OF THE INVENTION

This invention relates generally to surface inspection and characterization systems. More particularly, the invention relates to optical systems in which a reflected beam of light is utilized to measure the characteristics of a surface. The invention most particularly relates to a self-contained, portable system for measuring the orange peel characteristics of finished surfaces.

BACKGROUND OF THE INVENTION

It is often necessary to measure the surface characteristics of painted, plated, polished or otherwise finished objects in the course of their manufacture. Among the measurements which are commonly made are gloss, which is a measure of the dispersion with which light is reflected from a surface, distinctness of image, which is a measure of how clearly an object is reflected by a surface as well as orange peel and roughness, which are measurements of surface texture. Orange peel is a surface characteristic which is dependent upon the presence of surface features having a texture in the general size range of 0.05 to 1 millimeter, which produce texture appearing somewhat reminiscent of the skin of an orange. Orange peel is notoriously difficult to quantify with any accuracy because of the size and periodicity of the features.

In the prior art, orange peel measurements are made on a subjective basis by comparing a finished surface with a set of standards. This system of measurement is inaccurate, time consuming and expensive; hence, efforts have been made to automate orange peel measurements. Instrumental approaches to orange peel measurement typically involve the analysis of light reflected from the surface. The features comprising the orange peel texture reflect light at varying angles, and the changing pattern of reflectivity produced as a beam of light is scanned across a surface is analyzed to produce a signal indicative of the degree of orange peel. Analysis typically involves a determination of the rate of change and/or periodicity of the reflected light pattern.

Automated orange peel measuring systems of the prior art suffer from a lack of repeatability in their measurements. It is not unusual for repeat measurements of standard orange peel samples to vary by 30–60% when made with instruments of the prior art. In addition, orange peel measurements are most preferably made on site during the manufacture of items, particularly motor vehicles, household appliances and the like. Therefore, the measuring equipment is utilized in a production environment and typically encounters high levels of vibration, dust and vapors, all of which adversely affect the accuracy of readings made with the prior art equipment.

The production environment also mandates that the measuring equipment be relatively small in size, self-contained and easy to use and it is further desirable that the system be capable of operating for at least one full production shift without recharging or replacement of a power source. It is further desirable that the system be capable of storing data for archival purposes or subsequent analysis.

The system of the present invention provides a small, simple to use, self-contained instrument for measuring orange peel of finished surfaces. The system of the present invention is designed so as to be relatively insensitive to vibration and to be completely enclosed so as to eliminate problems from ambient pollutants. These and other advantages of the present invention will be readily apparent from the drawings, discussion and description which follow.

BRIEF DESCRIPTION OF THE INVENTION

There is disclosed herein a system for measuring an optical characteristic of the surface of a workpiece. The system includes a support block having a light source retained thereupon. The light source operates to produce a beam of light. The system further includes a scanning assembly having a mirror which is disposed so that the beam of light strikes a contact point on the mirror at a particular angle of incidence and is reflected therefrom onto the surface of the workpiece. The scanning assembly further includes a motor for rotating the mirror about an axis of rotation so that the angle of incidence of the beam of light varies as the mirror is rotated. The beam is thus swept across the surface of the workpiece so as to define a scan line thereupon. The system also includes an optical sensor which is retained upon the support block so as to receive a portion of the beam of light which is reflected from the surface. The sensor operates to provide a signal corresponding to illumination incident thereupon. The system further includes a driver for moving the support block, light source and sensor as a single unit, along a path of travel which will displace the contact point of the beam of light upon the mirror. In this manner, the scan line is laterally displaced along the surface of the workpiece as the support block is moved.

In one embodiment of the invention, the system includes no beam shaping optics disposed between the light source and the workpiece surface. The system may further include a cylindrical lens between the surface and the detector. Preferably, the system is contained within a housing, and the housing includes a window which permits passage of the beam of light therethrough to the workpiece surface, and return of the beam reflected from the workpiece surface to the detector.

In specific embodiments, the light source is a laser diode. In other embodiments, the mirror in the scanning assembly is a prismatic, polygonal mirror having a plurality of reflective facets. The system may further include a programmed microprocessor which receives the output signal from the optical sensor and calculates orange peel characteristics of the surface from the signal. The system may also include a display device, such as a liquid crystal device and/or an input device such as a keyboard in communication with the microprocessor. In some embodiments, the system may include a power source such as a rechargeable battery pack.

DETAILED DESCRIPTION OF THE INVENTION

The present invention is directed to a system for optically measuring the characteristics of a surface. The system of the present invention is particularly suited for measuring the orange peel characteristics of painted surfaces; and accordingly, finds significant utility in connection with the fabrication of motor vehicles. In the present invention, a beam of light is scanned across the surface a number of times so as to provide a series of spaced apart scan lines, and the light which is reflected from the surface is analyzed to determine orange peel or other surface characteristics. This approach improves the accuracy and precision of the measurements.

Figure 1:
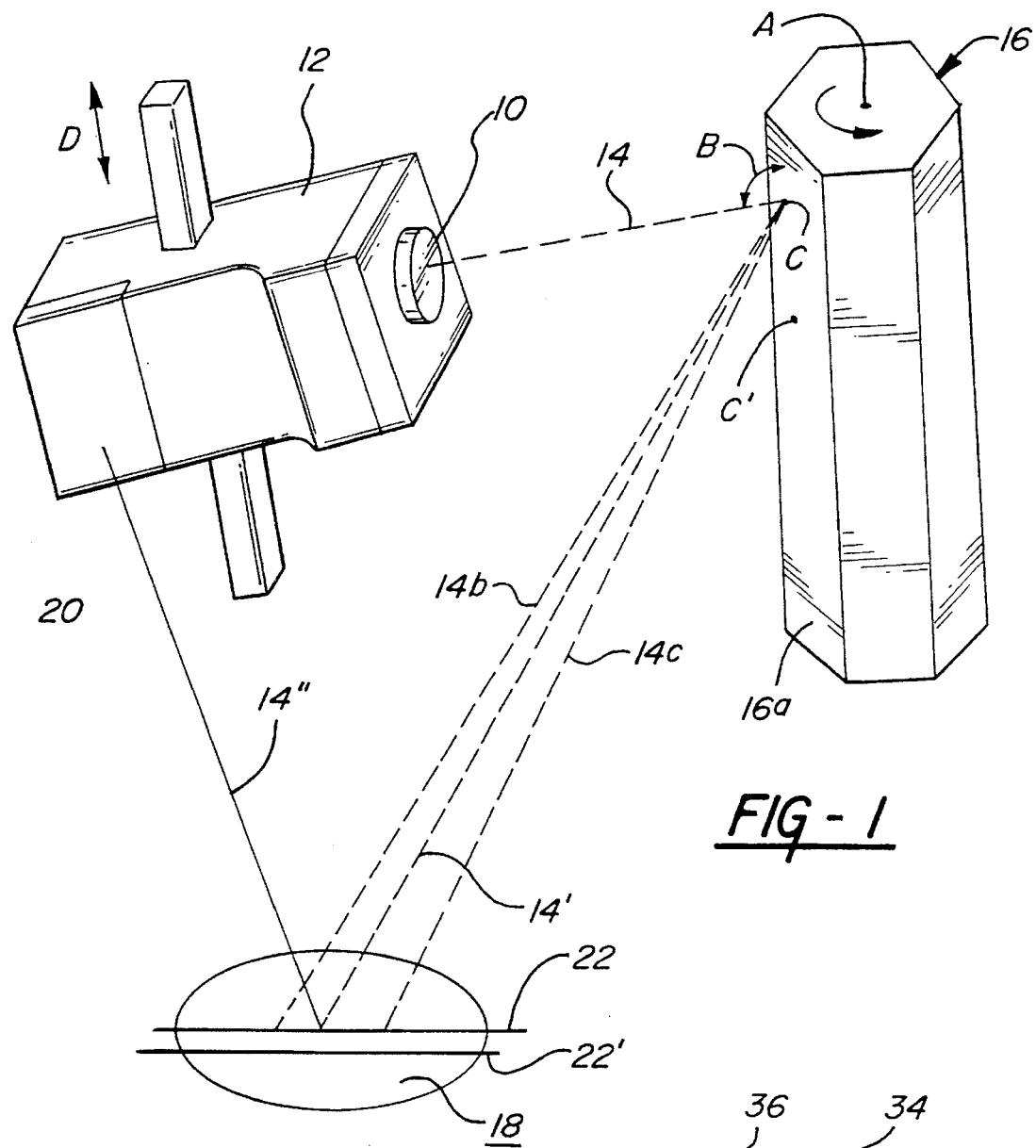
FIG. 1 is a simplified, schematic depiction of a portion of the system of the present invention.

Referring now to FIG. 1, there is shown a simplified depiction of the optical system of one embodiment of the present invention. As shown therein, a light source, which preferably comprises a solid state laser 10 is fixedly mounted to a support block 12. The light source 10 is operative to produce a beam of light 14 which is directed toward a scanning assembly. The scanning assembly includes a mirror, which in this instance is a polygonal mirror 16. As illustrated, the mirror is configured as a prismatic polygon having a number of light reflective facets, for example, facet 16a. In the context of this disclosure, a prismatic, polygonal mirror is meant to define those mirrors having a number of reflective faces which are generally planar, and which intersect one another at angles so as to form a closed structure having a polygonal cross section. In the illustrated embodiment, the polygonal mirror 16 includes six facets, although it is to be understood that the mirror may include a larger or smaller number of facets. The mirror 16 is rotatable about a central axis A.

The light beam 14 strikes the reflective facet 16a of the mirror 16 at a contact point C and forms an angle of incidence B therewith. The light is reflected from the facet 16a to form a beam 14' which strikes the surface of a workpiece 18. At least a portion of the beam 14' which is reflected from the facet 16a is in turn reflected by the surface of the workpiece 18 to form a beam 14" which falls upon a photo detector 20 which is also fixedly supported on the block 12.

In the operation of the optical system of FIG. 1, the polygonal mirror 16 is rotated by means of a motor, not shown in this drawing. Rotation of the mirror changes the angle of incidence B between the facet 16a and the light beam 14 thereby changing the point at which the reflected beam strikes the workpiece surface 18. Thus, rotation of the mirror causes the beam to be scanned across the surface of the workpiece along a scan line 22. Shown in FIG. 1 are two additional beams 14b, 14c representing alternative reflections occasioned by rotation of the polygonal mirror 16, and it will be noted that these beams 14b, 14c fall along the scan line 22. The rotational speed of the mirror will vary depending on the data rate at which the system operates, and the number of facets on the mirror. For the FIG. 1 system, the mirror typically rotates at 100–500 RPM. In one specific embodiment, the mirror rotates at 167 RPM and scans are made every 60 milliseconds.

In the operation of the system of the present invention, the support block 12 is moved up and down along axis D by means of a driver, not shown in this figure. As the support block is moved, the light source 10 and detector 20 attached thereto move with it as a unit. In general, the axis D will preferably correspond with the axis of rotation A of the polygonal mirror 16, and as the light source moves along axis D, the contact point C at which the beam 14 strikes the mirror 16 will be correspondingly displaced along the length of the mirror. Displacement of the contact point C will produce a corresponding displacement of the scan line 22 on the surface of the workpiece. For example, displacement of the beam 14 from contact point C to new location C' displaces the scan line 22 to a new location 22'. Thus it will be seen that by moving the support block up and down along axis D, and by rotating the polygonal mirror 16, the beam of light 14' will be repetitively swept across the surface of the workpiece along a group of generally parallel scan lines. In this manner, the system of the present invention operates to collect data from a relatively large area of the workpiece thereby improving the accuracy and precision of readings made thereby.

A further advantage of the present invention is achieved by disposing the light source 10 and detector 20 upon a single support block 12. This particular mounting system assures that the alignment between the light source and detector will be maintained thereby avoiding the need for the use of any compensating optical elements.

The system of the present invention, as illustrated in FIG. 1, may be implemented without any additional beam shaping optics between the light source and workpiece surface 18. By beam shaping optics is meant lenses, mirrors, holographic elements and the like which magnify, reduce or focus the beam. Typically, light gathering optics are associated with laser diodes, and in the context of the present disclosure, when reference is made to the fact that no beam shaping optics are present between the light source and workpiece, it is acknowledged that some optical elements may be present within the light source itself. The absence of beam forming optics improves the accuracy of the system since aberration introduced by lenses or other optical elements is eliminated. Also, the lack of the optical elements decreases the cost, weight and complexity of the system and minimizes the number of surfaces which need to be kept clean. The optical system of the present invention is insensitive to curvature of the workpiece surface occurring in the direction of the scan line and hence is well suited for making measurements on objects such as automotive body panels.

Variations of the FIG. 1 system are possible within the scope of the present invention. While the polygonal mirror 16 is shown as a prismatic, polygonal mirror having facets 16a which are all plane parallel to the axis of rotation A, the prismatic polygonal mirror may include faces which taper so as to define a plane which is angled relative to the rotational axis A. It is also to be understood that other configurations of the mirror may be employed. For example, the polygonal mirror may be replaced by a single mirror which is either rotated, or reciprocated in a back and forth motion so as to produce the scan line. Also, while the mirror is preferably a smooth, reflective surface, holographic mirrors and the like are not precluded by the present invention.

Figure 2:
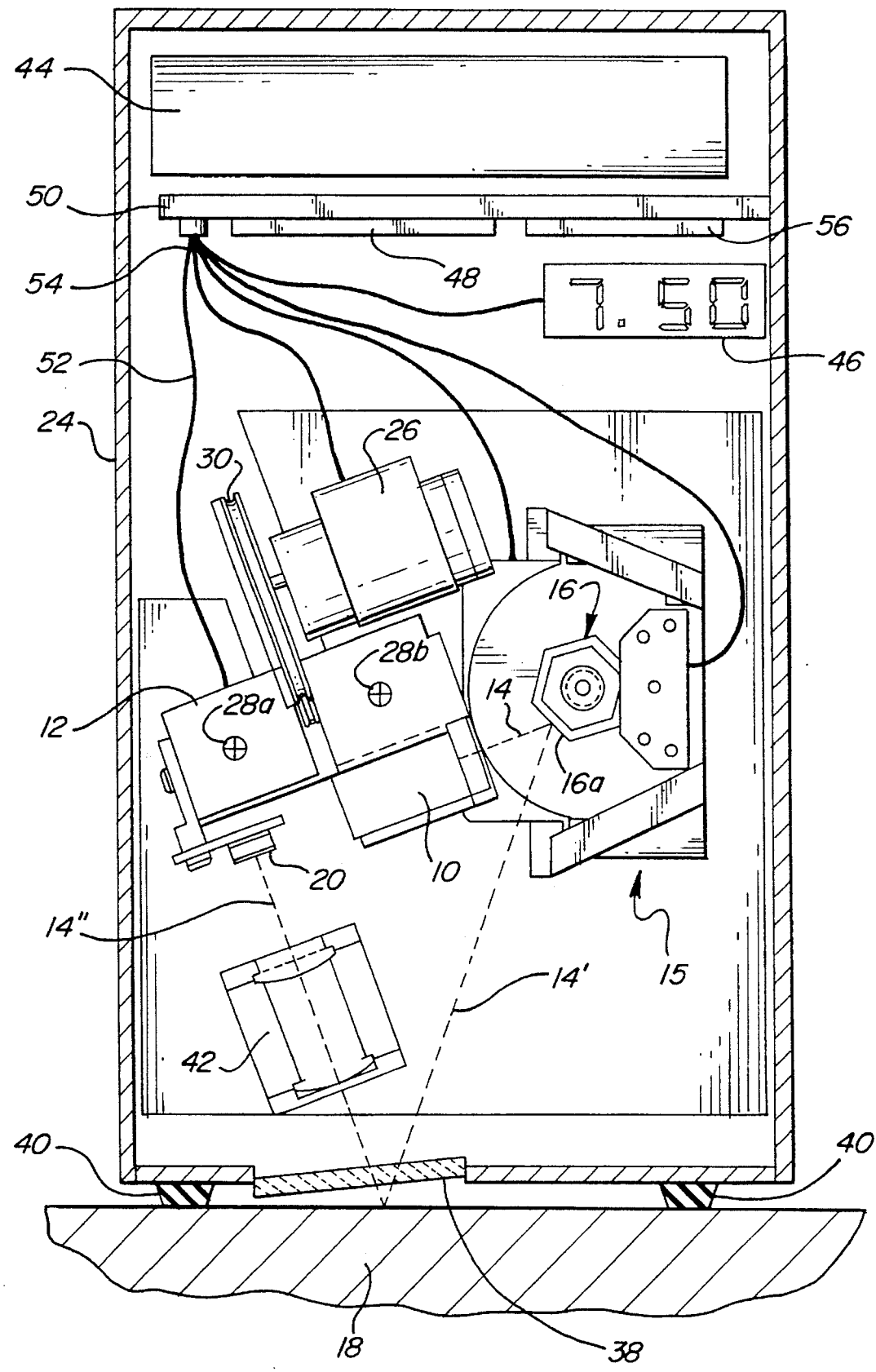
FIG. 2 is a cut-away, top plan view of one apparatus structured in accord with the present invention.

Referring now to FIG. 2, there is shown one specific embodiment of system structured in accord with the present invention as particularly adapted for the measurement of orange peel characteristics of painted surfaces. The system of FIG. 2 is contained within a housing 24, although it is to be noted that the present invention may be practiced with self-contained, as well as bench top units.

The system of FIG. 2 includes a support block 12 which is movable along an axis perpendicular to the plane of the drawing. Toward this end, the system further includes a motor 26 which drives the support block 12 along a pair of guide rails 28a, 28b passing therethrough, by means of a pulley 30. The motor 26, in this embodiment, is a coreless servo motor, although it is to be understood that other types of actuators such as ultrasonic drives and the like may also be employed provided they are capable of smoothly and reliably translating the support block 12.

Disposed upon the support block 12 is light source 10, which in this embodiment is diode laser having an output at approximately 670 NM. The laser 10 is a self-contained unit which produces a diverging beam of light 14. It is a notable feature of the present invention that the measurements may be made utilizing a diverging beam, without the necessity of any additional beam forming optics in the light path; although, it is to be understood that collimated beams and focussed beams may also be employed advantageously in the present invention. While the light source 10 is described as being a diode laser, other light sources could obviously be substituted therefor, and such sources include incandescent lamps, discharge lamps, other types of lasers and the like.

The system of FIG. 2 includes scanning assembly 15 which operates as previously described to scan a beam of light across the surface of a workpiece 18. The scanning assembly 15 includes a polygonal mirror 16 as previously described, as well as a motor and control system.

Figure 3:
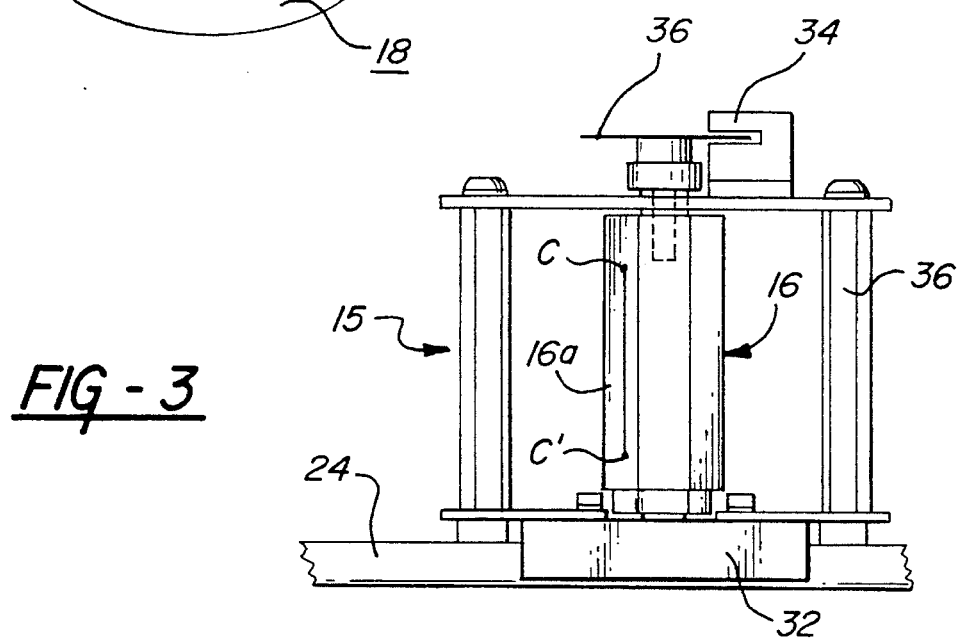
FIG. 3 is a side elevational view of the scanning assembly of the apparatus of FIG. 2.

Referring now to FIG. 3, there is shown a front elevational view of the scanning assembly 15 of FIG. 2. Visible in FIG. 3 is the polygonal mirror 16, which in this instance is right, hexagonal prism supported for rotation about its longitudinal axis. The mirror 16 is rotated by a motor 32, which in this instance is a flat configuration, coreless DC motor, although it is to be understood that other motor arrangements may be employed. The scanning assembly further includes a monitor assembly for measuring the speed and stability of rotation of the mirror 16. The monitor assembly includes an index wheel 36, which includes alternating high and low optical density sections. The wheel 36 is disposed so as to pass through a reader 34 which includes a light source and a light detector on opposed arms thereof. The reader 34 projects the light through the wheel 36 to produce a pulsed signal. This pulsed signal may be directed to a microprocessor which in turn controls the motor 32 to stabilize the rotation of the mirror 16. The mirror 16, motor 32, index wheel 36 and reader 34 are all supported by a frame 36 which in turn is supported in the housing 24.

As mentioned above, translation of the support block moves the contact point of the light beam along the surface of the mirror. As will be seen in the FIG. 3, the contact point is displaced linearly from point C to point C' along facet 16a of the mirror 16.

Referring back to FIG. 2, it will be noted that in the depicted apparatus, the beam of light 14' reflected from the mirror 16 passes through a window 38 in the housing 24, so as to strike, and be reflected from, the workpiece 18. While the window is not necessary for operation of the device, it has been found that its inclusion is desirable in a system used in a production mode, since the window 38 prevents entry of dust, dirt, vapors and other contaminants into the housing 24. It will be noted that the window 38 is disposed at a slight angle to the housing 24, and consequently is not parallel to the surface of the workpiece 18. It has been found that by placing the window 38 at a slight angle, interference occasioned by unwanted reflections from the window 38 is minimized. It will also be noted from FIG. 2, that the housing 24 includes legs 40 which support the housing 24 near to, but spaced from, the workpiece 18.

In the illustrated embodiment, the system includes a cylindrical lens 42 disposed between the surface of the workpiece 18 and the optical sensor 20. The cylindrical lens 42 is oriented with its long axis transverse to the direction of the scan line, and serves to collect and focus light onto the detector 20. Inclusion of the lens enhances the accuracy of the system, and makes it relatively insensitive to curvature in workpiece surface which occurs in the direction of the scan.

The detector 20 is preferably a position sensitive, linear array of photo responsive devices oriented so as to receive a scan line as reflected from the workpiece 18. The detector produces an output signal indicative of the portion of its length which is receiving illumination. The detector 20 is mounted with its linear axis transverse to the scan line and as such measures the displacement of the scan line resultant from the textured features of the surface. The detector array 20 is preferably an array of photoconductive devices, of the type which alter their electrical resistivity in proportion to the intensity of light incident thereupon. Other detectors such as photovoltaic detectors may be similarly employed.

In the operation of the present invention, it has been found advantageous to utilize the detector to cue reading of the scan data. This is accomplished by monitoring the detector output for a sudden increase in total photocurrent. When this increase is noted, reading is commenced. Very repeatable and dependable results are obtained in this manner. The magnitude of the photocurrent may also be monitored by the instrument to determine error conditions. For example, if the photocurrent is too lows the workpiece may be dull or diffuse, and hence unsuitable for reading, or the instrument itself may have a failure in the light source, or may have dirty optical surfaces. If the photocurrent is too high, the workpiece surface may be a mirror like reflector, not amenable to proper monitoring. As will be described in greater hereinbelow, these functions may be implemented through the use of a microprocessor controller.

The instrument of FIG. 2 is a totally self-contained instrument, and toward that end includes a rechargeable power source, which in this instance is a nickel cadmium battery pack 44. The instrument further includes a display 46 which is preferably a liquid crystal display, but may also comprise an LED display, a printer, a cathode ray tube or the like.

The system of the present invention is preferably under control of a microprocessor 48 disposed upon a circuit board 50 which is supported in the housing. The microprocessor 48 receives output signals from the photosensor 20 via a cable 52, and processes these signals in accord with algorithms known in the art, so as to provide a reading of orange peel texture, or any other such optical characteristic of the workpiece surface. The most preferred method for calculating the orange peel reading in the hereto embodiment is the RMS method. As known in the art, this method relies upon a measurement of the rate of change of reflected light intensity, at a given point, as a beam is scanned across the surface. Other methodologies may also be implemented in accord with the present invention.

The microprocessor 48 also operates to control translation of the support block 12 via control of the motor 26, as well as rotation of the mirror 16. The microprocessor 48 also drives the display device 46, all of which interface with the circuit board 50 via wiring harness 54 connected thereto. The microprocessor 48 may optionally have a memory storage unit 56 associated therewith, for storing data from a series of readings. This data may be subsequently downloaded into another system for statistical quality control. The storage device 56 may comprise a semiconductor memory, an optical memory, a magnetic memory or the like. Although not illustrated, the system may include a keyboard disposed in electrical communication with the microprocessor 48. The keyboard is used to initiate and control operation of the system and to enter data into the microprocessor 48.

In one variation of the present invention, the mirror 16 is also fixedly mounted to the support block 12, so that it moves up and down with the light source and detector thereby minimizing the effects of cross-system jitter. In an embodiment of this type, the contact point "C" of the light beam 14 will not be displaced along the length of the mirror, since the mirror will move with the light source. The displacement of the mirror and light source will displace the scan line. In this embodiment, as in the foregoing embodiment, the mirror will be moved so as to change the angle of incidence of the beam to produce the scan line. This can be accomplished, for example, by mounting the entire assembly 15 of FIG. 3 onto the block 12. In this particular embodiment, the optical path will preferably be arranged as a right triangle with the light source and detector at the right angled vertex thereof.

The afore-described invention may be practiced in a number of other embodiments. While the present invention has been primarily described with reference to a system for measuring orange peel; in view of the teaching herein, it is to be understood that other optically measurable parameters such as gloss, color, distinctness of image and so forth may be measured through the use of the invention. The foregoing drawings, discussion and description are merely meant to illustrate particular embodiments of the invention and are not meant to be limitations of the practice thereof. It is the following claims, including all equivalents, which define the scope of the invention.

I claim:

1. A system for measuring an optical characteristic of a surface of a workpiece, said system including:

a support block;

a light source which is retained upon the support block and is operative to project a beam of light;

a scanning assembly which includes a mirror which has a length and a width and is disposed so as to intercept said beam at a contact point thereupon and at an angle of incidence, and to reflect said beam on to a surface of a workpiece, said scanning assembly further including a motor for rotating said mirror about an axis of rotation so that the angle of incidence of said beam of light upon said mirror varies as said mirror is rotated and the beam which is reflected from the mirror is thereby swept across said surface so as to define a scan line thereupon;

an optical sensor retained upon said support block so as to receive a portion of the beam of light which is reflected from said surface, said sensor being operative to provide a signal corresponding to illumination incident thereupon;

a driver for moving said support block, light source and sensor as a single unit, along a path of travel which will displace the contact point of said beam of light along the length of said mirror, whereby the scan line is laterally displaced along said surface.

2. A system as in claim 1, further characterized in that it includes no beam shaping optics disposed between the light source and the surface of the workpiece.

3. A system as in claim 1, wherein beam of light projected from said light source is a diverging beam of light.

4. A system as in claim 1, wherein said light source is a solid state laser diode.

5. A system as in claim 1, further including a cylindrical lens disposed between the surface of the workpiece from which the beam of light is reflected, and the optical sensor.

6. A system as in claim 1, wherein said support block, light source, scanning assembly, optical sensor and driver are all disposed within a housing.

7. A system as in claim 6, wherein said housing includes a window disposed so as to permit the beam which is reflected from the mirror to pass through the housing and on to the surface of the workpiece, and to further permit the portion of the beam of light reflected from the surface of the workpiece to pass back into the housing and on to the optical sensor.

8. A system as in claim 7, wherein said window is supported by said housing so as to be in a non-parallel relationship with the surface of the workpiece when the workpiece is contacted by the housing.

9. A system as in claim 1, wherein said scanning assembly includes a prismatic, polygonal mirror having a plurality of reflective facets rotatable about said axis of rotation.

10. A system as in claim 1, wherein said optical sensor is a position sensitive linear array of photo responsive devices.

11. A system as in claim 10, wherein said photo responsive devices comprise photoconductive devices.

12. A system as in claim 1, further including a programmed microprocessor disposed in electrical communication with said optical sensor so as to receive the signal therefrom, said processor being operable to calculate orange peel characteristics of the workpiece surface from said signal.

13. A system as in claim 12, further including a display device in electrical communication with the microprocessor.

14. A system as in claim 1, further including a rechargeable, electrical storage cell in electrical communication with the light source, motor, driver and optical sensor.

15. A system for measuring orange peel of the surface of a workpiece, said system including:

a support block;

a laser diode light source which is retained upon the support block and is operative to project a beam of light;

a scan assembly which includes a prismatic, polygonal mirror having a plurality of reflective facets, each facet having a length and a width, said polygonal mirror being rotatable about a central axis by a motor associated therewith, said polygonal mirror disposed so that at any time one facet of said mirror intercepts the beam at a contact point thereupon and at an angle of incidence, so as to reflect the beam onto the surface of a workpiece, and so that the angle of incidence of said beam of light upon said facet varies as said polygonal mirror is rotated so that the beam which is reflected from the facet is swept across the surface so as to define a scan line thereupon;

an optical sensor, which is operative to produce an electrical signal corresponding to illumination incident thereupon, said sensor being retained upon the support block and positioned so as to receive a portion of the beam of light which is reflected from the surface of the workpiece; and a driver for moving said support block, light source and sensor as a single unit, along a path of travel which will displace the contact point of said beam of light along the length of said facet, whereby the scan line is laterally displaced along said surface as said driver moves the support block.

* * * * *